United States Patent [19]
Charapich

[11] Patent Number: 5,328,145
[45] Date of Patent: Jul. 12, 1994

[54] MOUNTING BOARD FOR VIDEO DISPLAY SCREEN HOUSING

[76] Inventor: Donald R. Charapich, 10332 Colony Park Dr., Fairfax, Va. 22032

[21] Appl. No.: 34,773

[22] Filed: Mar. 19, 1993

[51] Int. Cl.$^5$ ............................................. B41J 11/02
[52] U.S. Cl. ............................... 248/442.2; D14/114; 248/918
[58] Field of Search ................... 248/442.2, 444.1, 917, 248/918; 40/341; 400/718; 434/365; D14/114

[56] References Cited

U.S. PATENT DOCUMENTS

| | | |
|---|---|---|
| D. 251,792 | 5/1979 | Moody et al. |
| D. 262,978 | 2/1982 | Nagley. |
| 4,632,471 | 5/1984 | Visnapuu ................. 248/442.2 X |
| 4,869,565 | 9/1989 | Bachman .................... 248/918 X |
| 4,893,775 | 1/1990 | Long. |
| 4,934,853 | 6/1990 | King, III. |
| 4,946,121 | 8/1990 | Troke ........................ 248/918 X |
| 4,958,737 | 9/1990 | Auerbach. |
| 5,095,385 | 3/1992 | Stroll, Jr.. |
| 5,104,086 | 4/1992 | Ramey, III et al. ............ 248/442.2 |
| 5,104,087 | 4/1992 | Wentloff et al. ................ 248/442.2 |
| 5,122,941 | 6/1992 | Gross et al. ................. 248/442.2 X |
| 5,125,612 | 6/1992 | McNeal .......................... 248/442.2 |

OTHER PUBLICATIONS

"A Welcome Change of Screen," by Screenies, Inc.
"Put Your Computer in a Better Frame of Mind," by Screenies.
"Screen Buddy," Nu-Dell.

Primary Examiner—Ramon O. Ramirez
Attorney, Agent, or Firm—Oliff & Berridge

[57] ABSTRACT

A mounting board for a video display screen housing is a planar sheet having an opening for viewing the video display screen in one portion and other portions adjacent the opening for receiving mounts which can retain objects adjacent the planar sheet. An erasable layer can be laminated on the planar sheet to receive markings. The mounting board is attached to the video display screen housing by stabilizers. The stabilizers can be positioned to accommodate for variations in video display screen housings.

27 Claims, 4 Drawing Sheets

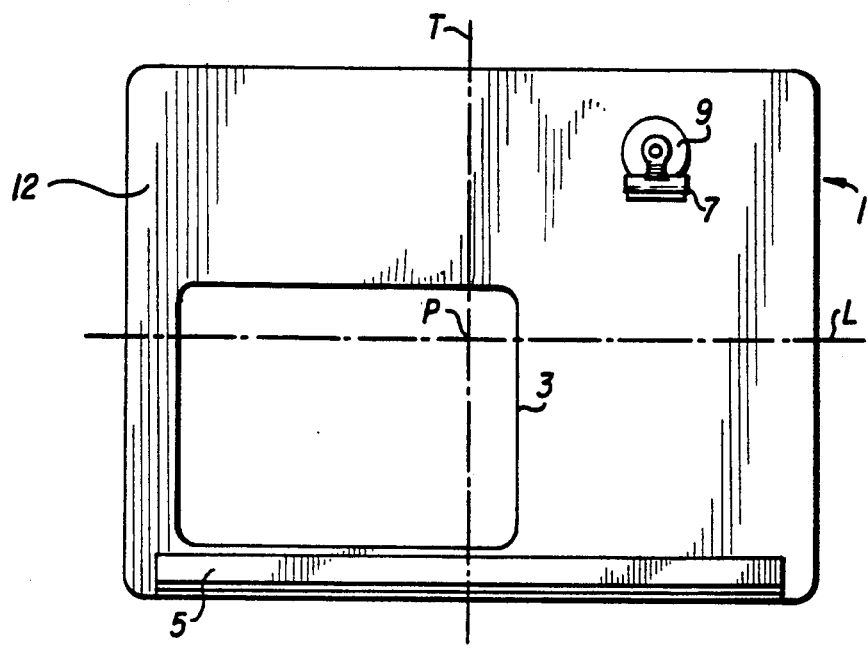
FIG. 1
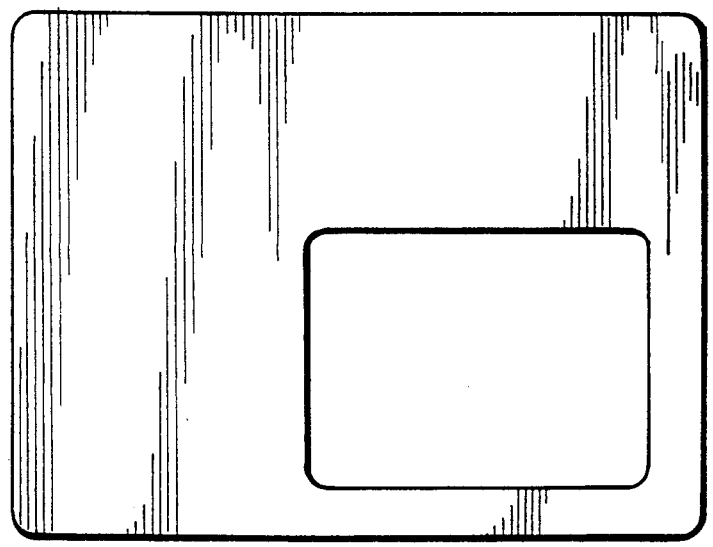
FIG. 2
FIG. 8
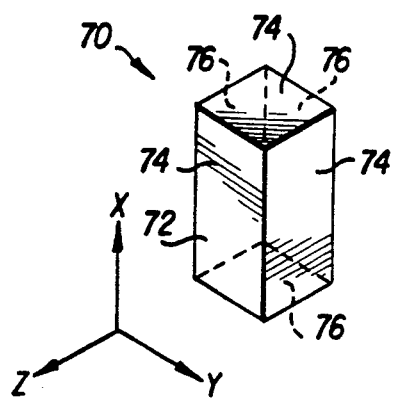
FIG. 9
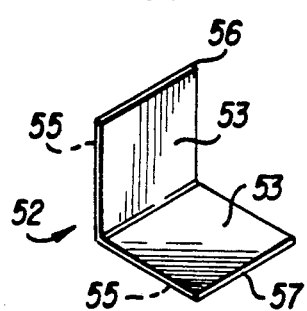
FIG. 10
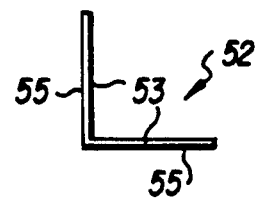

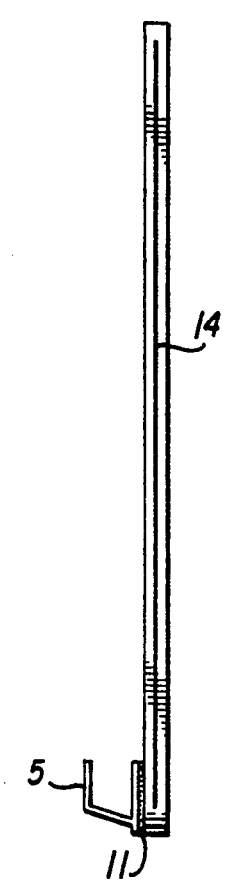
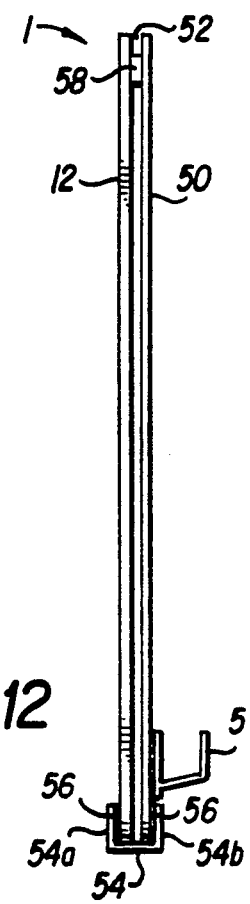
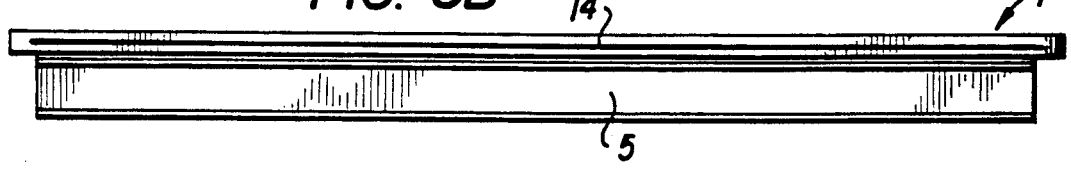
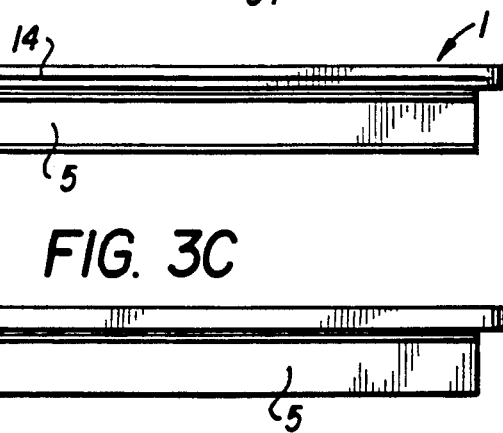
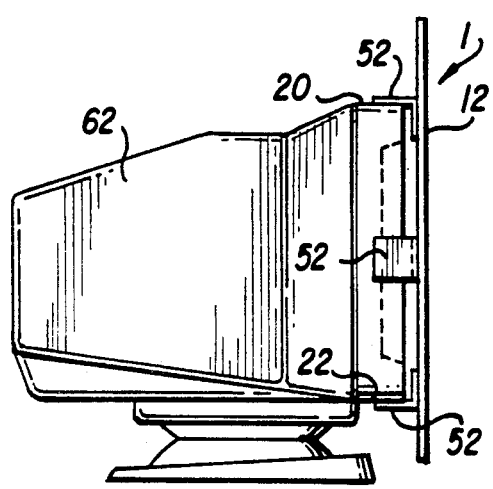

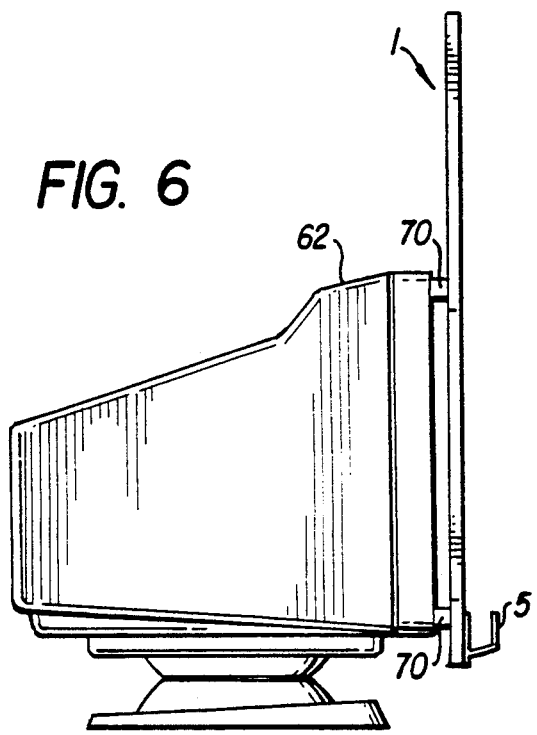
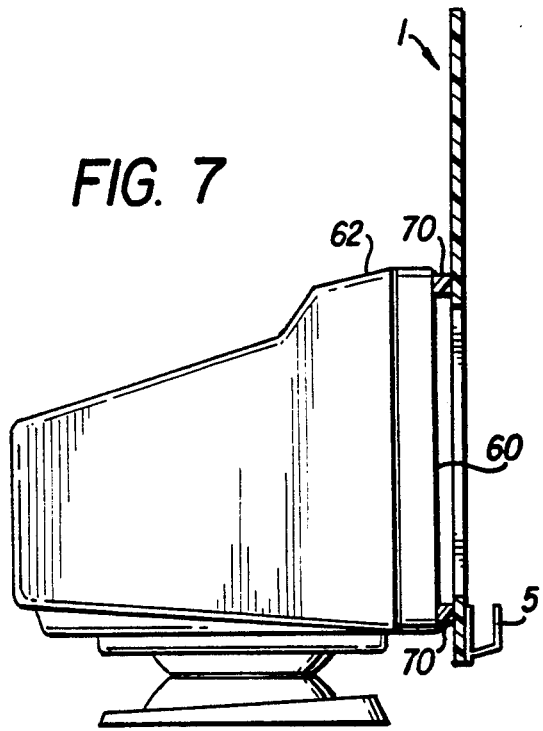
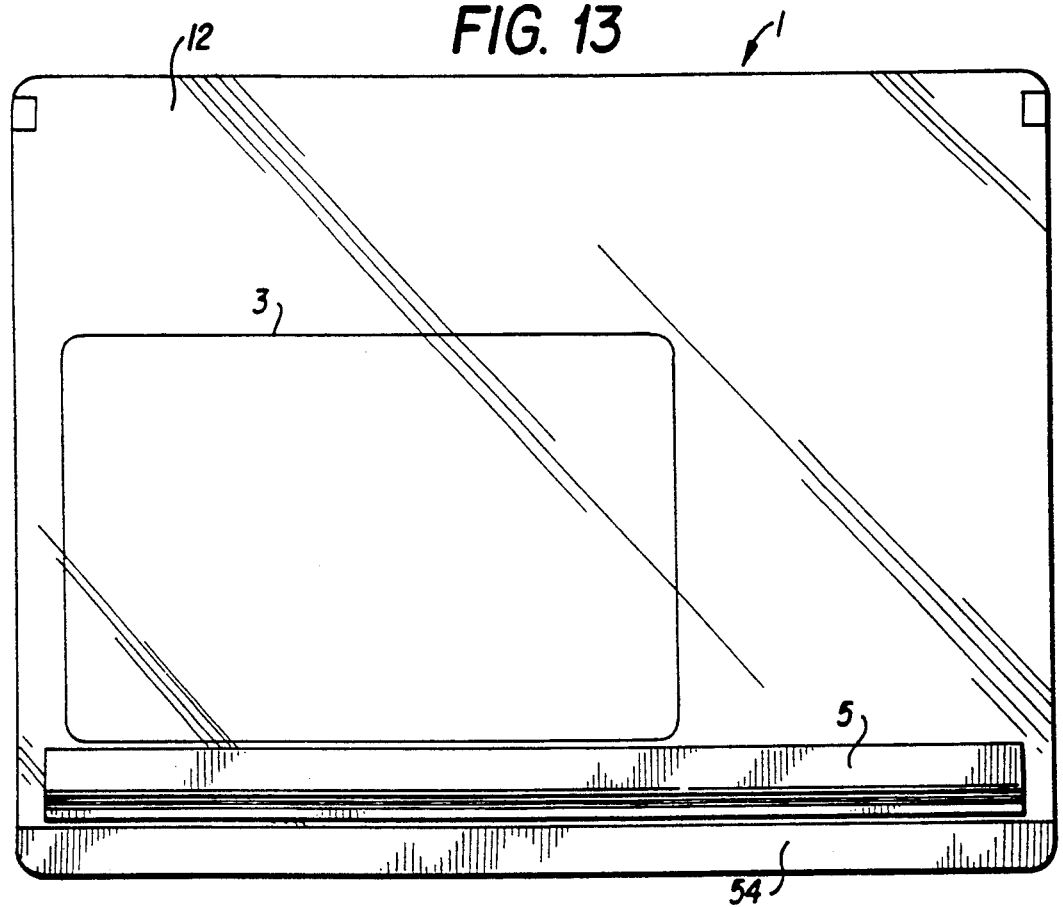

MOUNTING BOARD FOR VIDEO DISPLAY SCREEN HOUSING

FIELD OF THE INVENTION

This invention relates to a mounting board for mounting on a video display screen housing. More particularly, this invention relates to a mounting board which is mounted on the video display screen housing and permits the video display screen to be viewed through an opening in one portion of the mounting board and objects to be mounted on other portions of the mounting board.

BACKGROUND OF THE INVENTION

In many situations where a video display screen is a user's primary workstation or desktop, there is a need for a workspace in the vicinity of the video display screen. In an attempt to make important information and frequently used objects easily accessible, users may attach pieces of paper or writing instruments to the housing or the video display screen itself. Photographs and/or personal messages may also be attached to the video display screen or its housing. This has a tendency to clutter the workspace and encroach on or even cover the screen itself.

U.S. Pat. No. 5,095,385 issued to Stroll, Jr., discloses a complex glare reduction system for video display monitors in which bulletin boards can be attached to the sides and top of the system. Nevertheless, there still exists a need for a simple mounting board which can be quickly, easily and removably attached to any standard video display screen housing.

SUMMARY OF THE INVENTION

Accordingly, it is a primary object of the invention to provide a mounting board that is attachable to a video display screen housing.

Another object of the invention is to provide a mounting board having stabilizers capable of being selectively located and positioned so as to be able to attach the mounting board to standard video display screen housings which tend to vary in size and shape.

Another object of the present invention is to provide a work surface in the area adjacent the video display screen for mounting objects while maintaining full view of the video display screen.

Another object of the invention is to provide for organization of and ready access to information by being able to selectively locate objects on or adjacent the mounting board.

A further object of the invention is to have an erasable layer laminated on the mounting board to provide a location for receiving markings from an erasable ink pen.

A further object of the invention is to have the mounting board made at least in part of a transparent material layered on the mounting board with a space therebetween for inserting objects to be viewed by the user through the transparent material.

The foregoing objects are attained by the present invention which pertains to a mounting board for attachment to the housing of a video display screen. The mounting board comprises a planar sheet of rigid material having an opening in one portion shaped substantially correspondingly to the video display screen for viewing the screen. Other portions of the board adjacent the opening permit the mounting of objects. The other portions can be laminated with an erasable layer for receiving markings. The mounting board is secured to the housing by stabilizers which are preferably shaped as rectangular blocks. The stabilizers can be variably located and positioned between the mounting board and the video display screen housing to accommodate for size variations in video display screen housing.

Other objects, advantages and salient features of the invention will become apparent from the following detailed description, which, taken in conjunction with the annexed drawings, discloses preferred embodiments of the invention.

BRIEF DESCRIPTION OF THE DRAWINGS

Referring now to the drawings which form a part of this original disclosure:

FIG. 1 is a front view of the mounting board in accordance with a preferred embodiment of this invention including objects that can be mounted on the mounting board;

FIG. 2 is a rear view of the mounting board in accordance with the invention;

FIG. 3A is an end view of the mounting board of FIG. 1, the opposite end view being a mirror image;

FIG. 3B is a top view of the board of FIG. 1;

FIG. 3C is a bottom view of the board of FIG. 1;

FIG. 6 is a side view of the mounting board in accordance with the invention mounted with stabilizers on the housing of a video display screen;

FIG. 7 is a cross sectional view of the mounting board in accordance with the invention mounted with stabilizers on the housing of a video display screen and taken along the section line A—A in FIG. 4;

FIG. 8 is a perspective view of one stabilizer in accordance with the present invention;

FIG. 9 is a perspective view of a second embodiment of a stabilizer in accordance with the present invention;

FIG. 10 is a cross-sectional view of the second embodiment of the stabilizer in accordance with the present invention;

FIG. 11 is a side view of the mounting board in accordance with the invention mounted with stabilizers of the second embodiment on the housing of a video display screen;

FIG. 12 is a end view of a second embodiment of the mounting board in accordance with the invention; and FIG. 13 is a front view of a second embodiment of the mounting board in accordance with the invention.

DETAILED DESCRIPTION OF THE PREFERRED EMBODIMENTS

Figure 4:
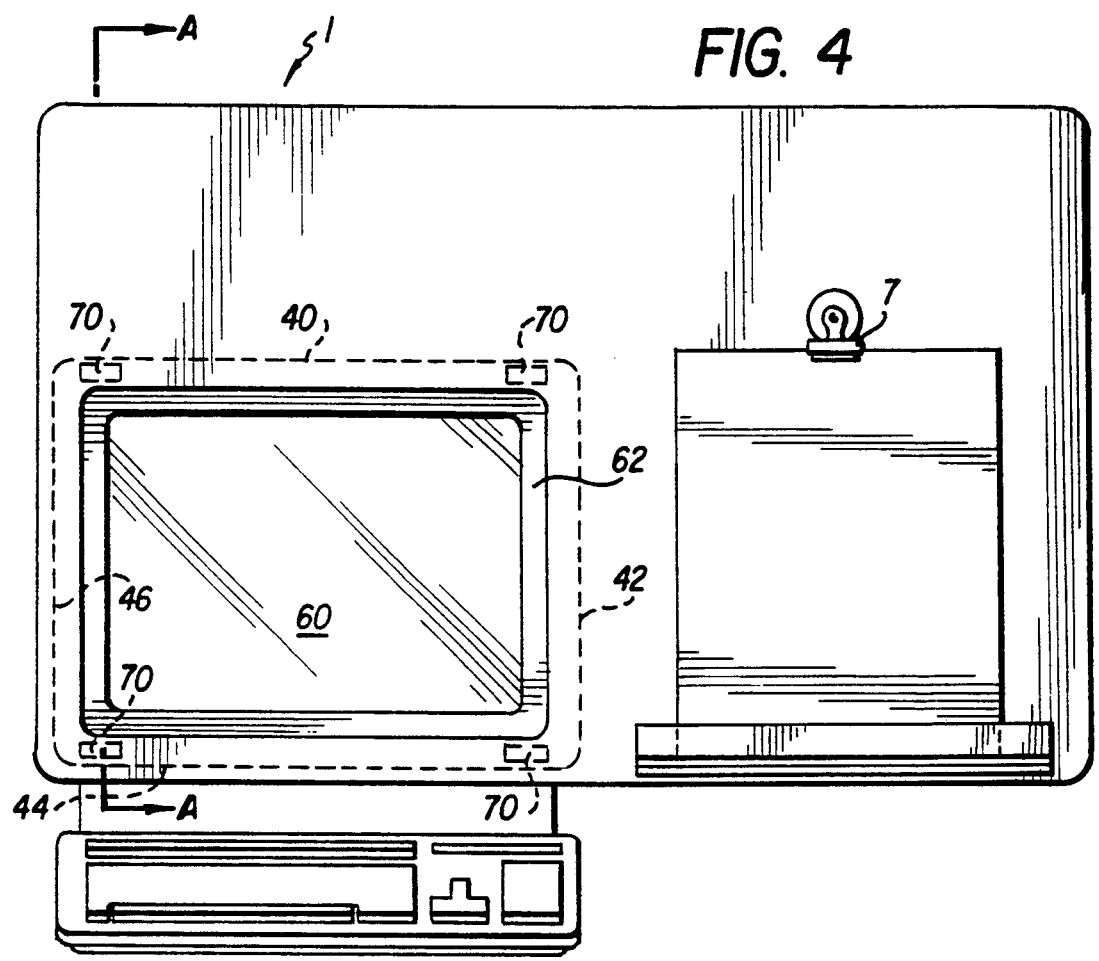
FIG. 4 is a front view of the mounting board in accordance with the invention mounted with stabilizers on the housing of a video display screen.
Figure 5:
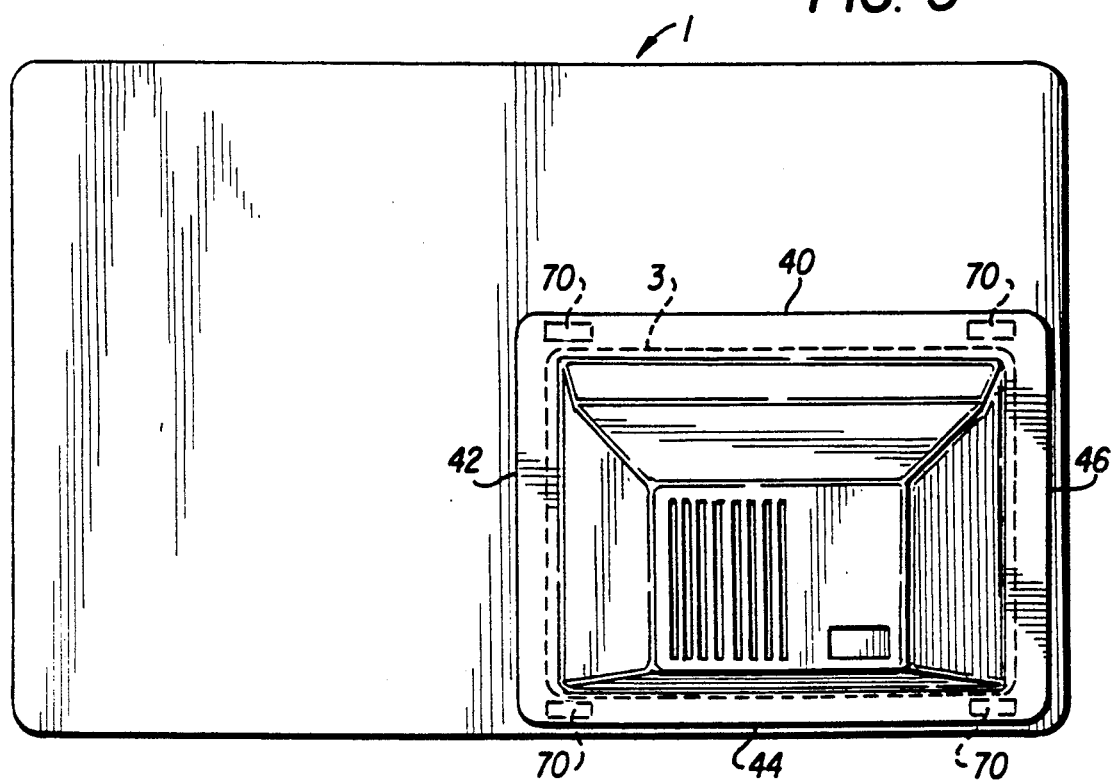
FIG. 5 is a rear view of the mounting board in accordance with the invention mounted with stabilizers on the housing of a video display screen.

As seen in FIGS. 1-4, the mounting board 1 in accordance with the invention is for mounting on a housing 62 of a video display screen 60 contained within the housing 62. The housing 62 (FIG. 4) has a front face defined by a top surface 40, bottom surface 44 and first and second side surfaces 42 and 46, which surround the video display screen 60. The housing 62 has side surfaces defined by a top side surface 20, a bottom side surface 22 and two side side surfaces.

The mounting board 1 as seen in FIGS. 1–3 is a planar sheet 12 of rigid material. The planar sheet of rigid material can be comprised of any conventional material such as plastic, pressed particle or paper board or foamed material and can comprise any desired level of transparency. In accordance with a preferred embodiment of the invention, the planar sheet is made of a masonite board. The planar sheet can be shaped in any shape desired, however, in accordance with a preferred embodiment of the invention, the planar sheet defines a substantially rectangular shape. The planar sheet has a central longitudinal axis L and a transverse axis T intersecting at a central point P and defining quadrants on the planar sheet.

The planar sheet 12 includes one portion which has an opening 3 extending through it. The opening 3 in accordance with the invention is shaped substantially correspondingly to the periphery of the display screen. The shape of the opening 3 in accordance with a preferred embodiment of the invention is rectangular. The opening in the planar sheet can be located anywhere in the planar sheet but is preferably offset from the central point P toward at least one quadrant. In a further preferred embodiment of the invention, the opening can be located predominately in a single quadrant.

The face of the planar sheet surrounding the opening defines other portions integral with and adjacent to the one portion having the opening. In a mounted position, the other portions of the planar sheet can extend in a direction away from any one or more of the top surface 40, the bottom surface 44 and the first and second side surfaces 42 and 46 of the front face of the display screen depending on where the opening is located. For example, when the opening is offset toward one quadrant as in the preferred embodiment, the other portions will extend above and to one side of the housing (with minimal portions below and to the other side of the housing). If the opening is centrally located in the planar sheet, the other portions will extend around the top, bottom and sides of the opening.

A layer can be attached to a front face of the planar sheet to cover at least one of the other portions of the planar sheet. The layer can be attached by means of lamination, adhesive, a molding process or the equivalent. In accordance with the invention, the layer can comprise an erasable layer which permits markings to be placed on and erased from the erasable layer. A marker, such as an erasable ink pen can be used in accordance with the invention. While the layer can be made from any material, the erasable layer in accordance with the invention is preferably made from a melamine material in addition to any other materials capable of functioning as an erasable layer.

In accordance with another preferred embodiment of the invention, the layer is preferably a transparent layer 50 (FIGS. 12 and 13) attached in a spaced relationship to the planar sheet 12. The space can include any size depending upon the distance between the planar sheet and the layer 50. The layer 50 and the planar sheet 12 are preferably in planes substantially parallel to each other. The space 50 provides a location for retaining objects such as but not limited to diagrams or scenic displays, calendars, photos, sheets of paper or business cards. In accordance with a preferred embodiment of the invention, it is an advantage to use the transparent layer with the planar sheet because the objects retained in the space are viewable by the user.

The layer can be attached in a spaced relationship to the planar sheet by any conventional means such as but not limited to adhesive, clips, connectors, a molding process or any equivalents. The layer and the planar sheet can be attached at any location between and/or adjacent the layer and the planar sheet. In accordance with a preferred embodiment of the instant invention (FIGS. 12 and 13), the layer 50 and the planar sheet 12 are attached along the lower edge of the planar sheet which runs parallel to the central longitudinal axis of the planar sheet.

In a further preferred embodiment, the layer 50 and the planar sheet 12 are attached in a spaced relationship by a U-shaped channel 54 having two legs (54a and 54b). The legs abut one each to the layer and the planar sheet. The U-shaped channel 54 can be attached to the layer and planar sheet by any conventional attachment means 56 such as but not limited to adhesive or glue.

In a further preferred embodiment, spacers 58 can be located between and attached to at least one of the planar sheet and the layer to provide for a continuous space therein. More preferably, the spacers maintain the planar sheet and the layer in substantially parallel planes. The spacers are preferably thin and small so as to fit between the planar sheet and the layer and to limit the space occupied by the spacer. The spacers can be made of any material which has at least one surface capable of attaching to at least one of the planar sheet and the layer.

The planar sheet can have a mount located on the other portions for holding an object adjacent the planar sheet 12. The objects to be mounted can include any object that is capable of being attached to the mounting board including but not limited to a sheet of paper, photograph, pen, etc. For example, the mount can be a clamp 7 or other conventional gripping devices which can be attached to the planar sheet. Preferably, the clamps or other gripping devices are removably attached to the planar sheet by a fastener 9 comprising hook and loop fasteners or the equivalent, but other fasteners are available such as adhesive or the equivalent. In accordance with another aspect of the invention, the mount can be a channel 5 located parallel to the longitudinal axis and extending away from the planar sheet for retaining objects such as pens, clips, etc. The channel 5 in accordance with the present invention is attached by double face adhesive tape 11. In a preferred embodiment, the channel 5 extends substantially across the longitudinal length of the plane sheet below the opening (FIG. 1), but many only extend for a smaller distance (FIG. 4). Further, objects such as self-stick notes or the like can be attached directly on the planar surface.

In accordance with a further embodiment of the invention (FIGS. 3A and 3B), the planar sheet can have slots 14 extending along a top edge surface or a side edge surface. The slots are generally a groove that is preferably shallow in depth and narrow in width. The slots provide a location for inserting or wedging objects including but not limited to business cards, notes, calendars and photographs.

The planar sheet in accordance with the invention can be attached to the housing by stabilizers 70, as seen in FIGS. 4–7. The stabilizers can be of any material, but are preferably wooden blocks. The stabilizers 70 extend between a rear face of the planar sheet and the top, bottom and/or side surfaces of the housing to stabilize the planar sheet 12 relative to the video display screen housing 62. The stabilizers 70 (FIG. 8) are substantially rectangular blocks having at least one rectangular cross-section. An advantage of the rectangular block stabilizer is that it has a different dimension along each of the X, Y and Z axes. As a result, the distance between the housing and the mounting board can be varied depending upon which dimension of the stabilizer is selected to extend therebetween. For example, if the screen is curved, then the stabilizers are positioned such that a large dimension extends between the housing and the mounting board. Conversely, where the screen is recessed in the housing then the stabilizers can be positioned such that a small dimension extends between the housing and the mounting board. The different dimensions along each axis of the stabilizer allows the board to accommodate various sized housings.

Further, the stabilizer can be arranged to accommodate varying shapes and sizes of housings by being attachable to top, bottom and/or side surfaces of the housing, whichever is most convenient for the user. The stabilizers have means for selectively securing the stabilizer to the rear face of the planar sheet 12 and the housing. In accordance with a preferred embodiment of the invention, each stabilizer comprises a rectangular block with planar faces 72. Opposing planar faces located in planes parallel to each other have one face with loop fasteners 74 and one face with adhesive 76. For each stabilizer, there is a corresponding hook patch capable of being attached to the housing (like fastener 9 in FIG. 1). The one planar face of the stabilizer with loop fasteners 74 attaches to a hook patch on the housing thereby forming a stable connection. The opposing face of the stabilizer with adhesive 76 attaches to the rear face of the planar sheet. Therefore, regardless of which dimension of the stabilizer extends between the housing and the rear face of the mounting surface, one planar face having loop fasteners can attach to the hook patch on the housing and one planar face having adhesive can attach to the rear face of the planar sheet.

In accordance with a further preferred embodiment of the invention (FIGS. 9 and 10), the stabilizers can comprise a bracket, and in a preferred embodiment of the invention, the bracket can comprise an L-shaped bracket 52. The bracket can be of any material. In accordance with this embodiment of the invention (FIG. 11), the bracket stabilizers extend between a rear face of the planar sheet and one or more of the top 20, bottom 22 and side side surfaces of the housing to stabilize the planar sheet 12 relative to the video display screen housing 62. The bracket stabilizers can be attached by any connection means to the housing and the planar sheet.

In accordance with a further embodiment (FIGS. 9 and 10) of the invention, the stabilizer 52 has an L-shape with inside faces 53. The inside faces have fasteners located thereon for attaching to the housing. In a further embodiment the fastener on one of the inside faces of the L-shaped stabilizer 52 is adapted to be received by a patch located on the housing. The fastener can be a hook material for attaching to a patch made of a loop material. The L-shaped stabilizer has outside faces 55 for attaching to the rear face of the planar sheet. Further, in accordance with this embodiment of the invention the L-shaped stabilizer 52 has two legs (56 and 57). The leg attached to the housing can be positioned according to the distance desired between the housing and the planar sheet (FIG. 11). The other leg attached to the rear of the planar sheet can be positioned such that the opening is adjacent the video display screen.

The quantity of stabilizers should be sufficient to stabilize the planar sheet on the housing. In accordance with a preferred embodiment of the invention four stabilizers can be used.

While advantageous embodiments have been chosen to illustrate the invention, it will be understood by those skilled in the art that various changes and modification can be made therein without departing from the scope of the invention as defined in the appended claims.

What is claimed is:

1. A mounting board for a video display screen contained in a housing having a front face surrounding the display screen, the front face being defined by a top surface, a bottom surface and first and second side surfaces, the mounting board comprising:

a planar sheet of material having an outer perimeter and an opening in one portion of the planar sheet within the outer perimeter, the opening extending through the planar sheet and having a perimeter shaped substantially correspondingly to a shape of the display screen;

stabilizers for attaching the planar sheet to the front face of the housing to mount the planar sheet on the front face of the housing, the stabilizers extending between the planar sheet and the front face of the housing;

the planar sheet including at least one other portion integral with and adjacent to the one portion having the opening, the at least one other portion extending generally parallel to a plane of the front face in a direction away from at least one of the top surface, bottom surface and the first and second side surfaces when the planar sheet is mounted on the front face of the housing.

2. The mounting board of claim 1, wherein the planar sheet defines central longitudinal and transverse axes intersecting at a center point of the planar sheet and dividing the planar sheet into four quadrants, the opening in the planar sheet being offset toward at least one quadrant.

3. The mounting board of claim 1, wherein the planar sheet is substantially rectangular.

4. The mounting board of claim 1 wherein the opening is substantially rectangular.

5. The mounting board of claim 1 further comprising an erasable layer laminated onto at least the at least one other portion, the erasable layer permitting markings to be placed on and erased from the erasable layer.

6. The mounting board of claim 1, wherein the at least one other portion extends away from one side surface of the front face.

7. The mounting board of claim 1, further comprising:

at least one mount located on at least the at least one other portion for holding an object adjacent the planar sheet.

8. The mounting board of claim 7, wherein the at least one mount is a clamp for holding a sheet.

9. The mounting board of claim 8, wherein the clamp is removably attached to the planar sheet.

10. The mounting board of claim 7, wherein the mount is a channel extending away from the planar sheet.

11. The mounting board of claim 1, wherein the stabilizers are rectangular blocks having means for attaching said rectangular blocks to said planar sheet and said housing.

12. The mounting board of claim 25, wherein said stabilizer comprises a bracket having first and second legs at an angle with each other.

13. The mounting board of claim 12, wherein said stabilizer has a first leg mounted on said housing and a second leg mounted on said planar surface.

14. The mounting board of claim 1, further comprising a layer attached in a spaced relationship with at least the at least one other portion of said planar sheet and defining a space between said layer and said planar sheet, whereby said space retains objects.

15. The mounting board of claim 14, wherein said layer is transparent and said objects are viewed by the user through said layer.

16. The mounting board of claim 15, wherein said layer is an erasable layer.

17. A mounting board for a video display screen contained in a housing having a front face surrounding the display screen, the front face being defined by a top surface, a bottom surface and first and second side surfaces, the mounting board comprising:
- a planar sheet of rigid material having central longitudinal and transverse axes intersecting at a central point on said planar sheet, said planar sheet defining substantially a rectangular shape;
- said planar sheet having an opening extending through the planar sheet, said opening being offset from said central point, said opening having a perimeter shaped substantially correspondingly to a shape of the display screen;
- stabilizers for attaching the planar sheet to the front face of the housing to mount the planar sheet on the housing, the stabilizers extending between the planar sheet and the housing;
- each stabilizer having securing means for securing said stabilizer to at least one of said planar sheet and said housing;
- the planar sheet including another portion integral with and adjacent to the one portion having the opening, said other portion extending away from the top surface, bottom surface and at least one of the first and second side surfaces when the planar material is mounted on the housing;
- said planar sheet having an exterior layer laminated thereon for application of markings and for attaching objects onto said planar sheet;

18. The mounting board of claim 17, wherein said central longitudinal and transverse axes define quadrants and said opening is located predominantly in a single quadrant.

19. The mounting board of claim 17, wherein said planar sheet contains slots to receive objects.

20. The mounting board of claim 17, wherein said external layer laminated on said planar surface is an erasable layer.

21. The mounting board of claim 17, wherein said securing means for securing said stabilizers to at least one of said planar sheet and said housing comprises hook and loop fasteners.

22. The mounting board of claim 17, wherein each said stabilizer comprises a block with planar faces:
- a first set of adjacent planar faces of said stabilizer having adhesive attached on each said planar face and a second set of adjacent planar faces having hook and loop fasteners attached on each said planar face, at least one of said planar faces of said first set of adjacent planar faces being attached to the planar sheet and at least one of said planar faces of said second set of adjacent planar faces being attached to the housing.

23. The mounting board of claim 22, wherein said block is rectangular in at least one cross section.

24. A mounting board for a video display screen contained in a housing having a front face surrounding the display screen, the front face being defined by a top surface, a bottom surface, and a first and second side surfaces, the mounting board comprising:
- a planar sheet of rigid material defining substantially a rectangular shape, said planar sheet having central longitudinal and transverse axes intersecting at a central point and defining quadrants on said planar sheet;
- said planar sheet having an opening in one portion of the planar sheet defining an open portion, said open portion being located substantially in a single quadrant, the opening extending through the planar sheet and having a substantially rectangular perimeter;
- stabilizers for attaching the planar sheet to the front face of the housing to mount the planar sheet on the housing, the stabilizers extending between the planar sheets and the housing;
- said stabilizers having planar faces with securement means for securing at least one of said planar faces with said planar sheet and at least one other of said planar faces with said housing;
- the planar sheet having at least one other portion integral with and adjacent to said open portion, the at least one other portion extending generally parallel to a plane of the front face and substantially away from the top surface and one side surface when the planar material is mounted on the housing;
- said planar sheet having an erasable layer laminated onto the at least one other portion, the erasable layer permitting markings to be placed on and erased from the erasable layer.

25. A mounting board for a video display screen contained in a housing having a front face surrounding the display screen, the front face being defined by a top surface, a bottom surface and first and second side surfaces, the mounting board comprising:
- a planar sheet of material having an opening in one portion of the planar sheet, the opening extending through the planar sheet and having a perimeter shaped substantially correspondingly to a shape of the display screen;
- stabilizers for attaching the planar sheet to the housing to mount the planar sheet on the housing, the stabilizers extending between the planar sheet and the housing;
- the planar sheet including at least one other portion integral with and adjacent to the one portion having the opening, the at least one other portion extending generally parallel to a plane of the front face in a direction away from at least one of the top surface, bottom surface and the first and second side surfaces when the planar sheet is mounted on the housing; and
- a layer adjacent to the at least one other portion of said planar sheet to define a space between said layer and said planar sheet to retain objects between the layer and planar sheet.

26. The mounting board of claim 25, wherein said layer is transparent and said objects are viewed by the user through said layer.

27. The mounting board of claim 25, wherein said layer is an erasable layer.

* * * * *